US009361178B2

(12) United States Patent
Hartwich et al.

(10) Patent No.: US 9,361,178 B2
(45) Date of Patent: Jun. 7, 2016

(54) METHOD AND DEVICE FOR IMPROVING THE DATA TRANSMISSION SECURITY IN A SERIAL DATA TRANSMISSION HAVING FLEXIBLE MESSAGE SIZE

(75) Inventors: Florian Hartwich, Reutlingen (DE); Jan Scheuing, Brackenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 115 days.

(21) Appl. No.: 14/236,180

(22) PCT Filed: Jul. 19, 2012

(86) PCT No.: PCT/EP2012/064135
§ 371 (c)(1),
(2), (4) Date: Apr. 18, 2014

(87) PCT Pub. No.: WO2013/020781
PCT Pub. Date: Feb. 14, 2013

(65) Prior Publication Data
US 2014/0223258 A1    Aug. 7, 2014

(30) Foreign Application Priority Data
Aug. 5, 2011   (DE) .......................... 10 2011 080 476

(51) Int. Cl.
*G06F 11/10* (2006.01)
*G06F 13/42* (2006.01)
(Continued)

(52) U.S. Cl.
CPC ........ *G06F 11/1004* (2013.01); *G06F 13/4282* (2013.01); *H04L 12/4135* (2013.01); *H04L 2012/40215* (2013.01)

(58) Field of Classification Search
CPC .................. H04L 12/413; H04L 29/06; H04L 2012/40215; H04L 12/4135; G06F 11/1004; G06F 13/4282
USPC ......................................................... 714/758
See application file for complete search history.

(56) References Cited

U.S. PATENT DOCUMENTS 5,671,223 A * 9/1997 Shachar .................. H04L 29/06
370/441
5,721,726 A * 2/1998 Kurnick .................. H04L 29/06
370/236

(Continued)

FOREIGN PATENT DOCUMENTS

CN     2661507     12/2004
CN   101135909 A   3/2008

OTHER PUBLICATIONS

Vieweg+Teubner, Bosch Kraftfahrtechnisches Handbuch ("Bosch Automotive Handbook"), 27th edition, 2011.

(Continued)

*Primary Examiner* — James C Kerveros
(74) *Attorney, Agent, or Firm* — Norton Rose Fulbright US LLP (57) ABSTRACT

A method is provided for serial data transmission in a bus system having at least two bus subscribers, which exchange messages via the bus, the send access to the bus for each message being assigned to a bus subscriber by the arbitration method according to CAN Standard ISO 11898-1; it being decided as a function of a suitable identification (EDL) which result from one of the CRC calculations started in parallel is used for checking the correct data transmission; for at least one value of the identification an additional condition being checked, and in response to its presence, fixed stuff bit sequences from one or more bits are inserted into the message by the sender, at least into parts of the message.

29 Claims, 7 Drawing Sheets

(51) Int. Cl.
*H04L 12/40* (2006.01)
*H04L 12/413* (2006.01)

(56) References Cited

U.S. PATENT DOCUMENTS

| | | | | |
|---|---|---|---|---|
| 6,426,813 | B1* | 7/2002 | Swenson | G01R 31/001 324/627 |
| 7,103,688 | B2* | 9/2006 | Strong | H04L 1/0002 709/233 |
| 7,738,462 | B2* | 6/2010 | Hwang | H04L 12/4135 370/389 |
| 8,166,221 | B2* | 4/2012 | Lee | G06F 13/385 710/74 |
| 8,284,821 | B2* | 10/2012 | Isoyama | H04L 12/40136 370/464 |
| 8,897,319 | B2* | 11/2014 | Fredriksson | H04L 29/0619 370/464 |
| 2002/0126691 | A1* | 9/2002 | Strong | H04L 1/0002 370/447 |
| 2008/0134945 | A1 | 6/2008 | Willey | |
| 2010/0106323 | A1* | 4/2010 | Wallaert | G05B 15/02 700/276 |
| 2010/0106810 | A1* | 4/2010 | Grohman | B60H 1/00735 709/220 |
| 2010/0115364 | A1* | 5/2010 | Grohman | H04L 12/413 714/748 |
| 2010/0275037 | A1* | 10/2010 | Lee | G06F 13/385 713/189 |
| 2011/0007759 | A1* | 1/2011 | Dawson | H04L 49/90 370/498 |
| 2011/0103390 | A1 | 5/2011 | Hall et al. | |
| 2012/0271975 | A1* | 10/2012 | Elend | H04L 12/12 710/105 |

OTHER PUBLICATIONS

G. Cena and A. Valenzano, "Overclocking of controller area networks" (Electronics Letters, vol. 35, No. 22 (1999), p. 1924.
"CAN with Flexible Data-Rate, White Paper, Version 1.0", published on May 2, 2011 on Internet p. http://www.bosch-semiconductors.bosch.de/en/ubk_semiconductors/safe/ip_modules/can_literature/can_liiterature/can_literature.html.
Unruh J et al: "Error Detection Analysis of Automotive Communication Protocols", SAE Special Publications, SAE Inc., US Jan. 1, 1990, pp. 43-52, XP001007280, ISSN: 0099-5908.
"Road vehicles Controller area network (CAN) Part 1: Data link layer and physical signaling; ISO+11898-1-2003", IEEE Draft; ISO+11898-1-2003, IEEE-SA, Piscataway, NJ, USA, vol. msc.upamd, Nov. 18, 2010, pp. 1-52, XP017637056, [retrieved on Nov. 18, 2010] paragraph [04,2].

* cited by examiner

Standard Format CAN

Extended Format CAN

SOF = Start Of Frame
RTR = Remote Transmission Request
SRR = Substitute Remote Request
IDE = Identifier Extension Bit

Fig. 1a

Standard Format CAN FD „Long"

Extended Format CAN FD „Long"

Standard CAN

| DLC | | DLC 1 | DLC 2 | DLC 3 |
|---|---|---|---|---|
| 0000 | 0 (not used) | 0 (not used) | 16 | 0 |
| 0001 | 1 | 1 | 1 | 1 |
| 0010 | 2 | 2 | 2 | 2 |
| 0011 | 3 | 3 | 3 | 3 |
| 0100 | 4 | 4 | 4 | 4 |
| 0101 | 5 | 5 | 5 | 5 |
| 0110 | 6 | 6 | 6 | 6 |
| 0111 | 7 | 7 | 7 | 7 |
| 1000 | 8 | 8 | 8 | 8 |
| 1001 | 8 | 9 | 9 | 12 |
| 1010 | 8 | 10 | 10 | 16 |
| 1011 | 8 | 11 | 11 | 20 |
| 1100 | 8 | 12 | 12 | 24 |
| 1101 | 8 | 13 | 13 | 32 |
| 1110 | 8 | 14 | 14 | 48 |
| 1111 | 8 | 15 | 15 | 64 |

Standard Format CAN FD „Fast"

Extended Format CAN FD „Fast"

METHOD AND DEVICE FOR IMPROVING THE DATA TRANSMISSION SECURITY IN A SERIAL DATA TRANSMISSION HAVING FLEXIBLE MESSAGE SIZE

FIELD OF THE INVENTION

The present invention relates to a method and a device for the serial data transmission between at least two subscribers in a serial bus system.

BACKGROUND INFORMATION

For example, the ISO standard family 11898-1 through -5 describes the Controller Area Network (CAN) as well as an extension of the CAN called "time-triggered CAN" (TTCAN), referred to in the following also as standard CAN. The media access control method used in the CAN is based on a bit-wise arbitration. In bit-wise arbitration, multiple subscriber stations are simultaneously able to transmit data via the channel of the bus system, without thereby interfering with the data transmission. Furthermore, the subscriber stations are able to ascertain the logical state (0 or 1) of the channel while transmitting a bit over the channel. If a value of the transmitted bit does not correspond to the ascertained logical state of the channel, the subscriber station terminates the access to the channel. In CAN, the bit-wise arbitration is usually carried out on the basis of an identifier within a message that is to be transmitted via the channel. After a subscriber station has sent the identifier to the channel in its entirety, it knows that it has exclusive access to the channel. The end of the transmission of the identifier thus corresponds to a beginning of an enable interval, within which the subscriber station is able to use the channel exclusively. According to the CAN protocol specification, other subscriber stations may not access the channel, that is, send data to the channel, until the sending subscriber station has transmitted a checksum field (CRC field, CRC field, "CRC checksum") of the message. Thus, an end point of the transmission of the CRC field corresponds to an end of the enable interval. A further property of the protocol specification is that, after, in each case, five bits having the same value, an additional, so-called "stuff bit" having an opposite value is inserted into the data flow by the sender, in order to ensure the appearance of signal edges which are required for the synchronization of the bus subscribers, particularly sampling points. The inserted "stuff bits" are discarded again on the receiver side. They are not subject to the CRC checking mentioned above.

Because of the protocol, thus, a non-destructive reliable transmission is achieved of that message via the channel that has won the arbitration process. The CAN protocols are particularly suited for transmitting short messages under real-time conditions, a suitable assignment of the identifiers being able to ensure that particularly important messages will almost always win the arbitration and be sent successfully.

Because of the transmission of a CRC field formed from the data transmitted before in the message, using a generator polynomial, and carrying out a CRC checking on the receiver side, a high transmission reliability or error detection reliability is yielded. The insertion of so-called stuff bits at places within the message, at which five successive, equal bits are transmitted, in connection with the resynchronization of the bit timing, with the aid of edges between the bits having a different value, ensures a high tolerance with respect to the oscillators used.

With the increasing networking of modern vehicles and the introduction of additional systems for improving driving safety, for example, or driving comfort, the demands grow on the quantities of data to be transmitted and the latency periods admissible in the transmission. Examples are driving dynamics control systems such as e.g. the electronic stability program ESP, driver assistance systems such as e.g. the automatic distance control ACC, or driver information systems such as e.g. the traffic sign detection (cf. for example descriptions in "Bosch Kraftfahrtechnisches Handbuch" ("Bosch Automotive Handbook"), 27th edition, 2011, Vieweg+Teubner).

G. Cena and A. Valenzano, in "Overclocking of controller area networks" (Electronics Letters, vol. 35, No. 22 (1999), p. 1924) deal with the effects of overclocking the bus frequency in subsections of the messages on the effectively achieved data rate.

The document "CAN with Flexible Data-Rate, White Paper, Version 1.0", published on May 2, 2011 on Internet page http://www.semiconductors.bosch.de/, introduces a modified data transmission protocol which, among other things, enables an enlargement of the data field as well as a shortening of the bit length for a part of the CAN message. Stuff bits that appear before the beginning of the CRC field are included in the CRC checking in CAN FD, which already leads to a higher data integrity. However, stuff bits appearing within the CRC field are further exempted from the CRC checking. This represents a limitation for the reliability of the error detection mechanisms of the protocol. It is clear that the related art does not provide results that are satisfactory in every respect.

SUMMARY OF THE INVENTION

In the following, the present invention and its advantages will be described with reference to drawings and exemplary embodiments. The subject matter of the present invention is not limited to the represented and described exemplary embodiments.

The present invention relates to a method for serial data transmission in a bus system having at least two bus subscribers that exchange messages over the bus, the transmit access to the bus for each message being assigned to a bus subscriber by the arbitration method according to CAN Standard ISO 11898-1; the messages having a logical build-up according to the CAN standard, thus being built up of start-of-frame bit, arbitration field, control field, data field, CRC field, acknowledge field and end-of-frame field; at the beginning of a message, in addition to the calculation of the CRC field according to the CAN standard, the calculation of at least one additional CRC field using a generator polynomial deviating from the CAN standard being started; during at least one of the additionally carried out CRC calculations, stuff bits which, according to the rules of the CAN standard, were inserted into parts of the message, which lie before the CRC field, being also taken into account; and, as a function of a suitable identifier (EDL), it being decided which result from one of the CRC calculations started in parallel will be used for checking the correctness of the data transmission.

The method is characterized in that, in the case of a corresponding identifier, an additional condition is checked, in response to whose presence, fixed stuff bit sequences of one or more bits are inserted at least into parts of the message. Thereby one is able to achieve the advantageous effect of specifically being able to generate signal edges in the message, which may be useful, for instance, for the checking and correction of the synchronization of the bus subscribers with one another, particularly if, as is provided in one especially advantageous specific embodiment, the first inserted bit of the fixed stuff bit sequence has an inverse value to that of the preceding bit.

In one particularly advantageous specific embodiment, the additional condition is specified in such a way that it occurs at regular intervals, so that at specified positions of the message, fixed stuff bit sequences of one or more bits are inserted into the message. Because of this, in a particularly simple manner, the insertion of the bits before sending and the removal of the bits in the received bus subscribers may be carried out. Since the insertion of the fixed stuff bit sequences does not take place as a function of data or, for instance, counters, the advantageous effect is achieved that two errors created by any interference in these parts of the transmitted bitstream are not able to multiply to become a multitude of errors, in that, because of the bit errors at one place in the message, a stuff bit is converted to an apparent data bit, and at another place a data bit is converted to an apparent stuff bit.

Furthermore, it is advantageous if, between two inserted fixed stuff bit sequences, at most four data bits are situated in each case, for then the violation of the stuffing rule according to the standard, namely the occurrence of six successive bits of the same polarity may be avoided, and the position of the fixed stuff bits is thus uniformly defined and not dependent on the data. The term "data bit" is used in this case for delimiting them from the stuff bits, and designates those bits which have to be transmitted by the sender to the receiver(s) as a component of the message format, i.e. in the start-of-frame bit, arbitration field, control field, data field, CRC field, acknowledge field and end-of-frame field.

It is advantageous if at least in the CRC field of an identified message, in response to the additional condition, fixed stuff bit sequences are inserted into the message, but one may also update the entire message by fixed stuff bit sequences. In one particularly advantageous specific embodiment, only the CRC field has fixed stuff bit sequences added to it. In one likewise advantageous specific embodiment, the CRC field of the identified messages has a number of bits deviating from the CAN standard, particularly a larger number. Moreover, the transmitted CRC field begins with such a fixed stuff bit sequence, so that a stuff condition occurring at the end of the data field are certainly trapped and the positions of the fixed stuff bit sequences are uniformly established. This ensures an optimized reliability of the data transmission by a very reliable detection of transmission errors.

It is moreover advantageous if the first identification for messages having standard addressing takes place by a recessive second bit in the control field and for messages having extended addressing by a recessive first and/or second bit in the control field. The modified messages are thereby clearly distinguishable to the bus subscribers from the messages according to the standard. In one specific embodiment, if the first identification is present, the control field of the messages includes more than six bits, in deviation from the CAN standard, in all data messages at least one dominant bit following, particularly, the recessive bit of the first identification. If the first identification is present, advantageously the edge between the recessive bit of the first identification and the at least one following dominant bit may be used for the resynchronization or the hard synchronization of the bit timings of the bus subscribers, which increases the reliability and the error reliability of the data transmission, upon a subsequent switchover of the bit length.

It is also advantageous, if the first identification is present, the data field of the messages is able to include more than eight bytes, in deviation from the CAN standard, since in this way the quantity of transmitted data per message, and with that, also the effective transmission rate, is able to be increased. The values of the four bits of the data length code are interpreted as least partially in deviation from the CAN standard for determining the size of the data field.

The first identification is advantageously evaluated in the bus subscribers and, as a function of the identification and the data length code, the receiving process is adjusted to the size of the data field. In that manner, an optimal flexibility of the data transmission is ensured.

Beyond that, in response to the presence of a second identification, the bit length for at least one specified or specifiable region within the message assumes a reduced value with respect to the bit length used before the presence of the second identification, the region beginning at the earliest with the second identification and ending at the latest with the CRC delimiter, so that advantageously the message is able to be transmitted in a shorter time via the bus. The second identification has the advantage that, because of the two-stage switchover, of the size of the data field, on the one hand, and, on the other hand, of the bit length in parts of the message, each having separate identification, the advantages of the two measures may also be utilized separately, if possible. For example, even if, for reasons of the bus topology, the switchover to shorter bit length is not possible, messages having a higher data volume may further be used. Also, when errors occur in messages having shortened bit length, one may first switch over to the normal bit length, without sacrificing the advantages of the enlargement of the data region.

Furthermore, it is advantageous for identification and synchronization purposes, if the second identification also takes place by a recessive bid in the control field, which is transmitted after the bit of the first identification in time, especially if this is separated from the recessive bit of the first identification by at least one dominant bit.

In one advantageous specific embodiment, the second identification is evaluated in the bus subscribers if the first identification is present, and as a function of the value of the second identification, the receiving process is adjusted to the different values of the bit length within a message. This ensures a reliable detection of the messages transmitted in a sped-up manner.

In a manner that is advantageous because it minimizes the implementation effort, the at least two different values of the bit length in time within a message are implemented by using at least two different scaling factors for setting the bus time unit relative to a smallest time unit or the oscillator clock pulse in ongoing operation.

The method is advantageously applicable in the normal operation of a motor vehicle for transmitting data between at least two control units of the motor vehicle, which are connected via a suitable data bus. It may equally be used advantageously during the manufacturing or maintenance of a motor vehicle for transmitting data between a programming unit connected to a suitable data bus for programming purposes and at least one control unit of the motor vehicle that is connected to the data bus. A further advantageous possibility for use exists in the operation of industrial control systems, especially for long connecting lines. In all cases, the flexibility in the transmission rate is advantageous at simultaneous very high transmission reliability, so as to adjust the transmission method to the respective conditions, such as the signal propagation times.

An additional advantage is that a standard CAN controller only needs to be modified minimally in order to be able to operate in accordance with the present invention. A communications controller according to the present invention, which is also able to work as a standard CAN controller, is only negligibly larger than a conventional standard CAN controller. The associated application program does not need to be modified, and even then advantages in the speed of data transmission are already achieved.

Advantageously, substantial portions of the CAN conformance test (ISO 16845) may be adopted. In one advantageous development, the transmission method according to the present invention may be combined with the supplements of TTCAN (ISO 11898-4).

The present invention will be described in greater detail below on the basis of the drawings.

DETAILED DESCRIPTION

Figure 1A:
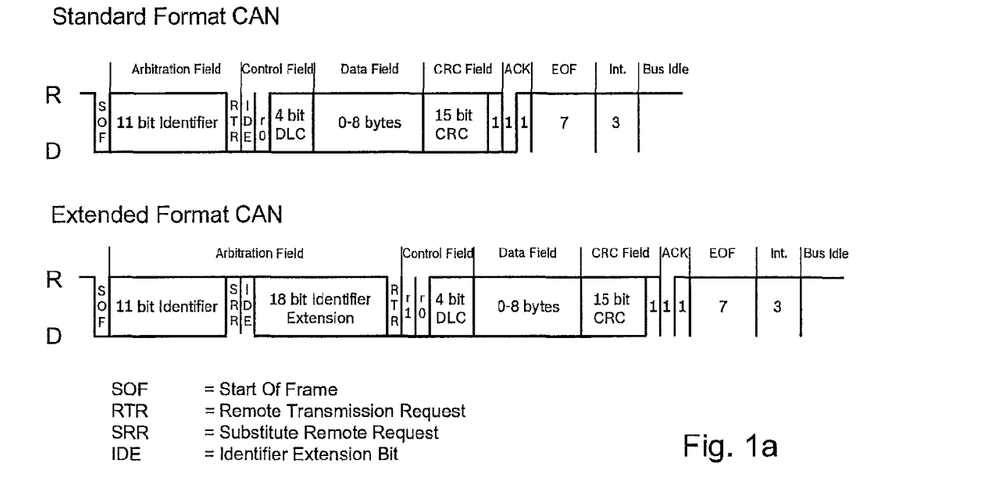
FIG. 1a shows the two alternatives for the build-up of data messages according to CAN Standard ISO 11898-1, CAN Standard Format and CAN Extended Format.

FIG. 1a shows the structure of messages as they are used in a CAN bus for data transmission. The two different formats "standard" and "extended" are shown. The method according to the present invention is applicable to both formats in suitable specific embodiments.

The message begins with a "start of frame" (SOF) bit, which signals the beginning of the message. This is followed by a section that is used primarily for identifying the message and on the basis of which the subscribers of the bus system decide whether to receive the message or not. This section is called an "arbitration field" and contains the identifier. This is followed by a "control field" containing, among other things, the data length code. The data length code contains information about the size of the data field of the message.

This is followed by the actual "data field", which contains the data to be exchanged between the subscribers of the bus system. This is followed by the "CRC field" having the 15-bit checksum and a delimiter, and subsequently two "acknowledge" (ACK) bits, which signal to the sender the successful reception of a message. The message is concluded by an "end of frame" (EOF) sequence.

In the standard CAN transmission method, the data field may contain a maximum of 8 bytes, that is, 64 bits of data. According to the standard, the data length code includes four bits, which is to say that it can assume 16 distinct values. Of this value range, in today's bus systems, only eight different values are used for the various sizes of the data field from 1 byte to 8 bytes. A data field of 0 bytes is not recommended in standard CAN, and sizes above 8 bytes are not permitted. The assignment of the values of the data length code to the sizes of the data field is shown in FIG. 2 in the standard CAN column.

Figure 1B:
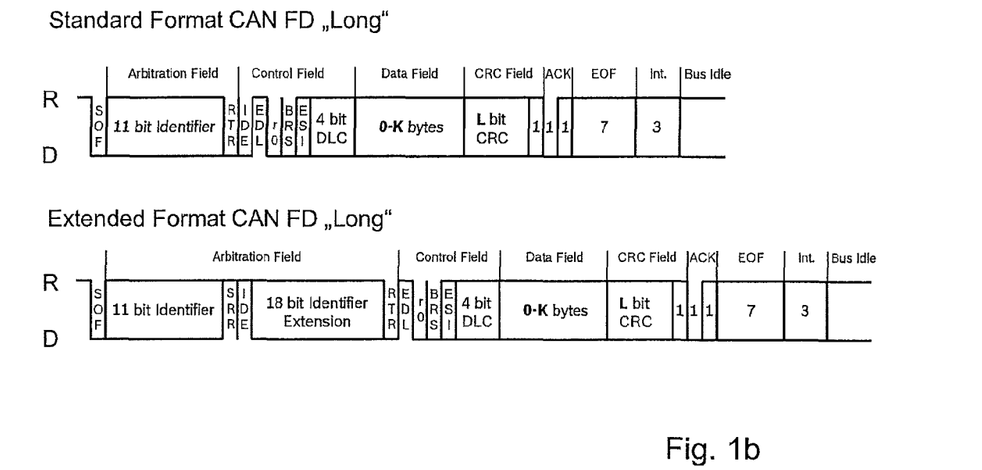
FIG. 1b shows two examples for the format of "CAN FD Long" messages having a changed control field and a flexible size of the data field and the CRC field, as modified by contrast to the ones in FIG. 1a, in the data transmission method according to the present invention. What is shown is both a modification of a Standard CAN message and a modification of an Extended CAM message.

In FIG. 1b, in an analogous representation, the modified messages to be transmitted in accordance with the present invention are juxtaposed, respectively derived from the two standard formats. They differ from the messages according to the standard in FIG. 1a by the complementation of some additional bits in the control field, which are designated by EDL, BRS, ESI, and whose purpose will be explained below. Furthermore, the messages according to the present invention differ by the variable size of the data field and the CRC field. The messages therefore bear the label "CAN FD Long".

In the transmission method modified in accordance with the present invention, the data field may also contain more than 8 bytes, namely, in the represented embodiment, up to K bytes. In contrast to the standard CAN, additional values able to be assumed by the data length code are used to identify larger data fields. For example, the four bits of the data length code may be used to represent the values from zero to 15 bytes. Other assignments may also be made, however, one possibility being the use the value of the data length code DLC=0b0000, which is normally not used in today's CAN messages, for another possible size of the data field, for the size of 16 bytes, for example.

Figure 2:
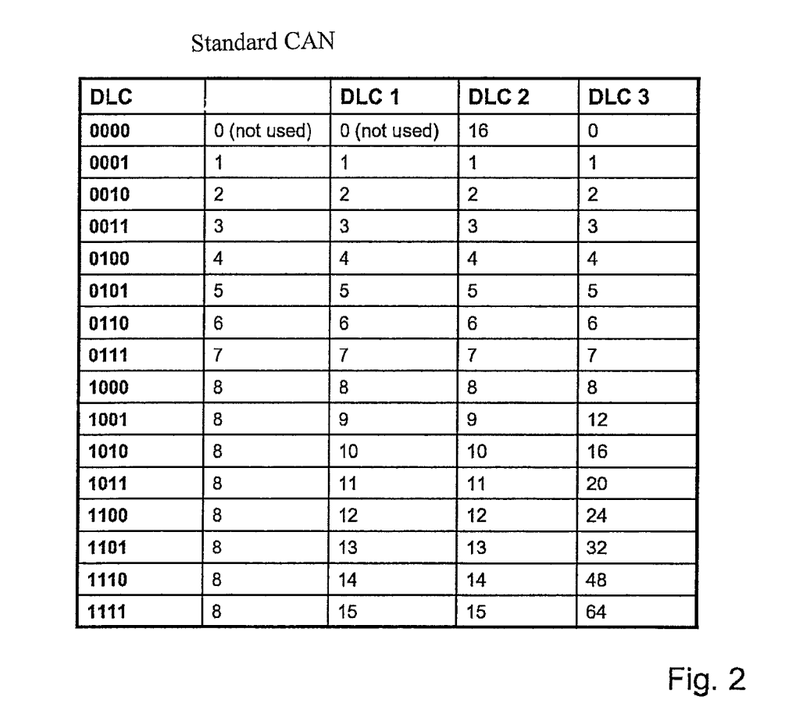
FIG. 2 represents various possibilities of how the content of the data length code may be interpreted by the data transmission according to the present invention, in a manner deviating from the CAN Standard ISO 11898-1.

These two possibilities are shown in FIG. 2 in tabular form as DLC 1 and DLC 2. The maximum size of data field K in this case has the value 15 and 16, respectively. Another possibility is that for the values of the data length code greater than 0b1000 and up to 0b1111, the associated sizes of the data field grow by a greater increment. One example for this case is shown in the table as DLC 3. The maximum size of data field K in this variant reaches the value 64. A different selection is possible, of course, such as an increment of 4 bytes in each case.

To ensure that such a communications controller, according to the present invention, is able to determine in what manner it must interpret the contents of the data length code, it is advantageous for the communications controller to recognize independently whether the communication of the bus system occurs according to standard CAN or according to the method of the present invention. One possibility for this is to use a bit within the arbitration field or the control field which, in standard CAN, is always transmitted having a fixed value, for identification such that from this first identification the communications controller is able to derive a first switchover condition, on the basis of which it selects the transmission method that is to be used.

Identification in Standard Addressing:

The second bit of the control field of standard CAN data messages is always sent dominantly in standard format, as shown in FIG. 1a in the upper part, and is designated by r0. In the example of a message according to the present invention shown in the upper part in FIG. 1b, having standard addressing (that is, having an arbitration field according to standard CAN) this second bit of the control field is used for identification, by sending it recessively. A recessive value of the second bit of the control field in such a message thus indicates that the message format deviating from the standard will be transmitted in the following. This recessively transmitted second bit of the control field of a message having a standard arbitration field is designated by EDL (extended data length). The bit r0 that is always transmitted dominant in standard CAN is replaced in messages according to the present invention by the recessive EDL bit, or, in the messages according to the present invention, it moves back by one position to the place between recessive bit EDL and bit BRS that is also recessive in response to the switchover of the bit length. Moreover, further additional bits may be inserted in the control field. In FIG. 1b, for example, a bit named ESI is shown, which we shall go into at a later point. At this place, two or more bits could also be inserted, without this having an effect on the method according to the present invention.

Thus, all in all, the bit sequence in the control field of standard CAN messages
{IDE, r0, DLC3, DLC2, DLC1, DLC0}
in messages according to the present invention is replaced by
{IDE, EDL, N additional bits, DLC3, DLC2, DLC1, DLC0}.

In the example shown in FIG. 1b, N=3 applies with the inserted bits r0, BRS, ESI. N could also, however, assume any other values greater than zero. Bit BRS should, if necessary, be inserted, for reasons that will be explained below, after an always dominantly transmitted bit, for example, in combination with, and directly after bit r0.

Identification in Standard Addressing:

The first two bits of the control field of standard CAN data messages is always sent dominantly in extended format, as shown in FIG. 1a in the lower part, and designated by r1 and r0. In the example of a message according to the present invention shown in the lower part in FIG. 1b, having extended addressing (that is, having an arbitration field according to extended CAN format) the first bit r1 of the control field is used for identification, by sending it recessively. A recessive value of the first bit of the control field in such a message indicates in this case that the message format deviating from the standard will be transmitted in the following. Here too, this recessively transmitted bit of the control field is designated as EDL (extended data length). It replaces the reserved, dominant bit r1 of standard CAN messages by extended format. Alternatively, dominant bit r1 could be maintained and move one space back, so that the EDL bit would be inserted as an additional bit between RTR and r1. It would also be possible to insert the EDL bit (recessive) as an additional bit between r1 (dominant) and r0 (dominant). Subsequently, further additional bits may also be inserted in the control field in this case. In FIG. 1b, for example, the bit named ESI is shown again, which we shall go into at a later point. Two or more bits could also be inserted, without this having an effect on the method according to the present invention. Thus, all in all, the bit sequence in the control field of extended standard CAN messages
{r1, r0, DLC3, DLC2, DLC1, DLC0}
in messages according to the present invention is replaced by
{EDL, N additional bits, DLC3, DLC2, DLC1, DLC0} or
(r1, EDL, M additional bits, DLC3, DLC2, DLC1, DLC0}.

The example shown in FIG. 1b shows the variant first named with N=3, namely, having inserted bits r0, BRS, ESI. N or M could also, however, assume any other values greater than zero. Bit BRS should, if necessary, be inserted, for reasons that will be explained below, after an always dominantly transmitted bit, for example, in combination with, and directly after bit r0.

Alternatively, it is also possible to apply the method in suitable communications controllers that are not also configured for standard-conforming CAN communication. In this case, the determination of the mentioned first switchover condition, for example as a function of a suitable identification of the messages, may also be dropped. In this case, the communications controllers rather operate exclusively according to one of the described methods and are accordingly usable only in bus systems in which such communications controllers according to the present invention are used exclusively.

If, as provided in the present invention, the data field of messages is enlarged, then it may be practical to adapt also the method utilized for the cyclic redundancy check (CRC) in order to obtain a sufficient immunity against error. In particular, it may be advantageous to use a different CRC polynomial, for example of a higher order, and accordingly to provide a CRC field of a deviating size in the messages modified in accordance with the present invention. This is indicated in FIG. 1b by the fact that the CRC field of the messages of the present invention has a length of L bits in the example provided, it being possible for L to be unequal to, in particular greater than, 15, in deviation from standard CAN.

The use of a modified method for calculating the CRC checksum may be signaled to the bus subscribers by a further identification, which represents a third switchover condition. In one specific embodiment, this further identification may agree with the first identification and/or switchover condition.

In standard CAN controllers, the CRC code of CAN messages to be transmitted is generated using a feedback shift register, the serially transmitted bits of the message being fed sequentially into its input. The width of the shift register corresponds to the order of the CRC polynomial. The CRC encoding occurs by combining the register content with the CRC polynomial during the shift operations. When CAN messages are received, the serially received bits of the message are accordingly shifted into the CRC shift register. The CRC test is successful if, at the end of the CRC field, all bits of the shift register are at zero. The CRC code generation in the sending case and the CRC test in the receiving case both occur in hardware, without requiring an intervention of the software. A modification of the CRC encoding thus does not affect the application software.

In the standard CAN protocol, the stuff bits within the CAN messages (cf. ISO 11898-1, chap. 10.5) are not included in the calculation or checking of the CRC code (cf. ISO 11898-1, chap. 10.4.2.6: " . . . the bit stream given by the destuffed bit sequence . . . "). This has the consequence that in rare cases two bit errors in one message are not detected, even though the CRC should actually detect up to five randomly distributed bit errors in one message, at a Hemming distance of six. This case may occur, for example, if, because of bit errors at one location of the message, a stuff bit is converted into an apparent data bit, and at another location a data bit is converted to an apparent stuff bit (cf. Unruh, Mathony and Kaiser: "Error Detection Analysis of Automotive Communication Protocols", SAE International Congress, No. 900699, Detroit, USA, 1990). For instance, two bit errors, which are created in the transmitted message supplemented using stuff bits by any interference whatever, such as electromagnetic effects, may increase in this way to a plurality of deviations between the originally transmitted data stream not yet supplemented by stuff bits and the received data stream cleared of stuff bits. Such a plurality of deviations may, under certain circumstances, no longer be detected by the cyclic redundancy check.

In the modified transmission method, first of all, the CRC encoding is changed, in contrast, in such a way that the stuff bits, which are inserted within the message before the beginning of the CRC field, are taken into account in the CRC calculation or the CRC checking. That is to say that in this specific embodiment the stuff bits belonging to the arbitration field, control field and data field are treated as part of the data to be protected by the cyclic redundancy check. Thereby the risk drops out that two errors created by any interference in these parts of the transmitted bit stream will increase, as described above, to a plurality of errors.

A clearly lesser, residual risk remains in that, within the CRC field, during the transmission, for instance, two bit errors may be created which increase to a corresponding plurality of deviations in response to the removal of the stuff bits.

The data transmission reliability may still further be increased, in this case, by inserting additional stuff bits or stuff bit sequences into the CRC at established positions. (In the following text we shall no longer distinguish between fixed stuff bits and fixed stuff bit sequences, thus fixed stuff bit sequences may also mean individual bits. In this case, by contrast to normal stuff bits, for example, bits necessarily inserted at fixed positions are involved, which prevent violating the stuffing rule according to the standard. For this purpose, an additional fixed stuff condition may be defined which triggers the insertion of the fixed stuff bit sequence. For instance, the stuffing control unit may be switched over from the mode, according to the standard, having data-dependent control to an additional mode having counter-dependent control. Whenever a bit counter reaches a specified value, for example, three or four, the fixed stuff condition is triggered and a fixed stuff bit sequence is inserted. In the simplest case, the instruction for inserting the fixed stuff bit sequence is identical to inserting the stuff bits according to the standard, that means, a single bit, that is inverse to the preceding bit, is inserted into the transmitted bit stream.

According to the protocol specifications of the standard CAN, after, in each case, five bits having the same value, an additional stuff bit having an opposite value is inserted into the data stream, in order to ensure the appearance of signal edges, which are required for the synchronization of the bus subscribers, particularly sampling points. In the specific embodiment shown, according to the present invention, after respectively four bits of the CRC, one or more bits are inserted into the CRC field, the first inserted bit having the opposite value of the preceding bit. Thus, in the simplest case, every fifth bit is transmitted as an inverse bit to the preceding one. Because of this, a false interpretation of stuff bits as data bits or of data bits as stuff bits based on bit errors is not possible, since the position of the stuff bits is not a function of the values of previously transmitted bits. Furthermore, each fixed stuff bit and each fixed stuff bit sequence may be checked individually for correctness, since the value is a function of a local condition (the value of the preceding bit). Alternative specific embodiments may provide, for example, that one should already insert a fixed stuff bit sequence after respectively three bits of the CRC, or alternatingly after respectively three, two or four values in any sequence. The method may also be extended to areas of the message outside the CRC field.

Figure 1C:
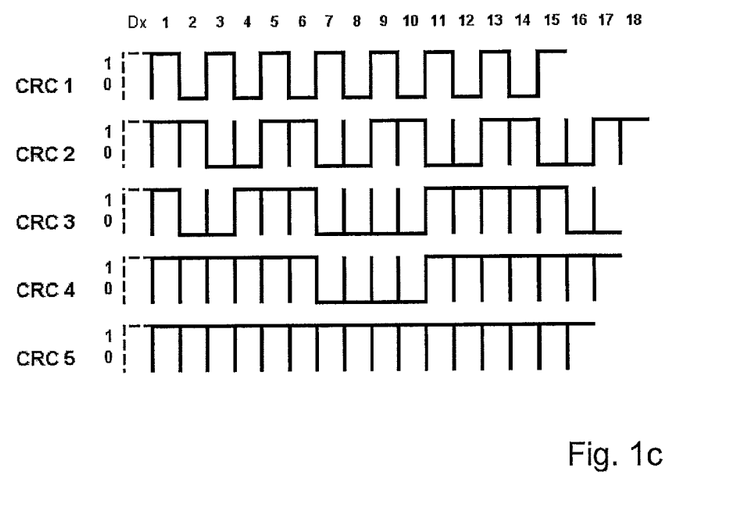
FIGS. 1c, 1d, 1e show some exemplary embodiments of the modification according to the present invention of the transmitted CRC field by inserting additional fixed stuff bits or fixed stuff bit sequences.
Figure 1D:
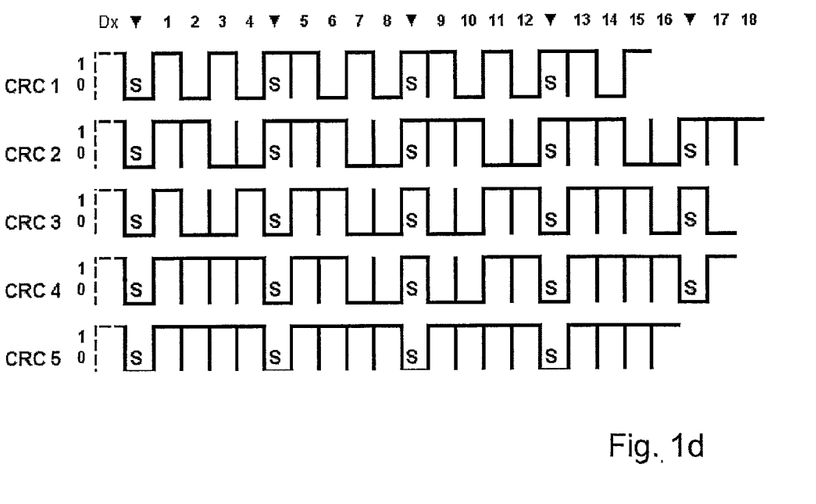
Figure 1E:
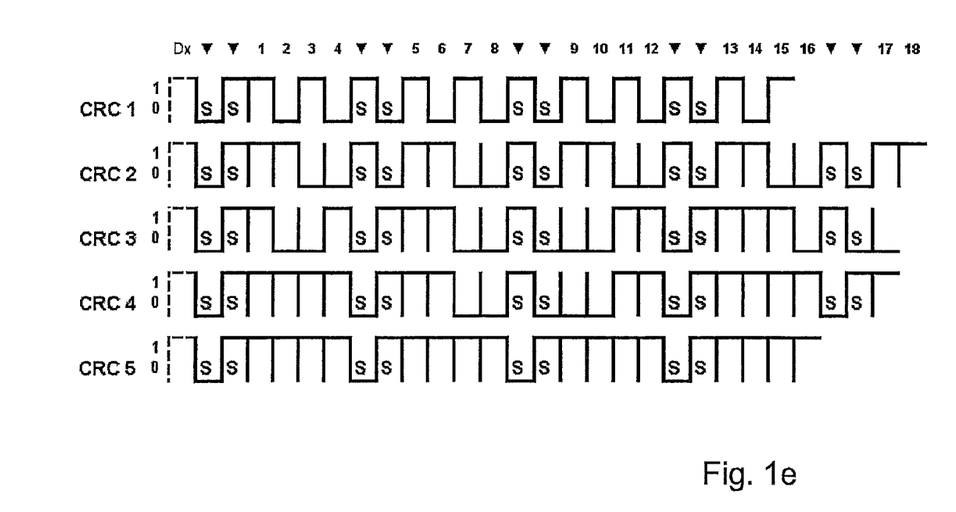

Some examples for inserting the fixed stuff bits and the fixed stuff bit sequences are shown in FIGS. 1d and 1e.

FIG. 1c represents a series of bit sequences from a data stream that is to be transmitted before inserting any (fixed) stuff bits. The sections designated as CRC1, . . . , CRC5 each correspond to the last bit of a data field Dx and a CRC sequence made up of 15 to 18 bits. The bit sequence is selected arbitrarily. In CRC3, in the transmission according to the standard, after 15 bits, a dominant (value "0") stuff bit would be inserted, and also in CRC4. Additional stuff bits would possibly be present at least in sequences CRC4 and CRC5 as a function of the content of the preceding, not shown, data bits. However, the position is a function of details of the preceding data.

By contrast, in FIG. 1d it is shown how fixed stuff bits in the data stream, identified by an "S", are inserted by a specific embodiment of the method according to the present invention at specified positions designated by a triangle. An analogous image is shown in FIG. 1e, the difference being that, in each case, a sequence of two fixed stuff bits has been inserted. In both cases, four bits of the actual data stream lie between respectively two fixed stuff bit sequences. The case that is also possible, that fewer (for instance, three) or changing numbers of bits lie between the fixed stuff bit sequences, is not shown.

In one advantageous specific embodiment, the communications controller is configured in such a way that it is compatible with the standard CAN, that is, it works in a standard-conforming fashion in a standard CAN bus system, while in a bus system modified in accordance with the present invention it allows for larger data fields in the messages, on the one hand, and, on the other hand, also performs the adapted calculation and checking of the CRC code.

Since, at the start of the reception of a message, it is not yet clear whether a standard-conforming CAN message or a message modified in accordance with the present invention is being received, two CRC shift registers are implemented in a communications controller according to the present invention, which work in parallel. After the reception of the CRC delimiter, when the CRC code is evaluated in the receiver, it is established based on the further identification according to the present invention, which transmission method has been used, and then the shift register associated with this transmission method is evaluated. As already explained above, the additional identification may agree with the first identification, which concerns the size of the data field and the interpretation of the data length code.

To be sure, it is already clear to the sender at the beginning of sending a message, according to which transmission method a transmission is to occur. Since it could happen, however, that the arbitration regarding bus access is lost and the started message is not sent, but instead a different message is received, both CRC shift registers are activated in parallel in this case as well.

The described implementation of two CRC shift registers working in parallel also allows for another improvement:

The CRC polynomial of the standard CAN protocol ($x15+x14+x10+x8+x7+x4+x3+1$) is configured for a message length of less than 127 bits. If messages transmitted in accordance with the present invention also use longer data fields, then it is practical to use a different, in particular longer, CRC polynomial in order to maintain transmission reliability. The messages transmitted in accordance with the present invention accordingly receive a modified, in particular longer, CRC field. In ongoing operation, the communications controllers switch dynamically between the two CRC shift registers, that is, between the standard CAN-conforming shift register and the shift register of the present invention, in order to use the respectively fitting polynomial.

Of course, more than two shift registers and accordingly more than two CRC polynomials may also be used, graduated as a function of the length of the data field or the desired transmission reliability. In this case, if a compatibility with the standard CAN is to be maintained, the corresponding identification and the associated switchover condition must be adapted. For example, the second bit of the control field could represent a first identification which characterizes a switchover to longer data fields, for example according to DLC 1 in FIG. 2, and an associated second CRC polynomial. For messages which include longer data fields and are characterized by the first identification, an additional bit, for example, could be inserted in the control field, which characterizes the switchover to an additional set of data field sizes, for instance, DLC3 in FIG. 2, and a third CRC polynomial. The insertion of additional bits in the control field of messages that have the first identification is possible, since, in this instance, in any case a modified transmitting and receiving process is used, and consequently such modifications are able to be taken into account. The compatibility with standard CAN exists because if the first identification is not present, then in the example shown, that is, in response to a dominant second bit of the control field, the build-up of the messages follows exactly the specifications of ISO Standard 11898-1.

Figure 3:
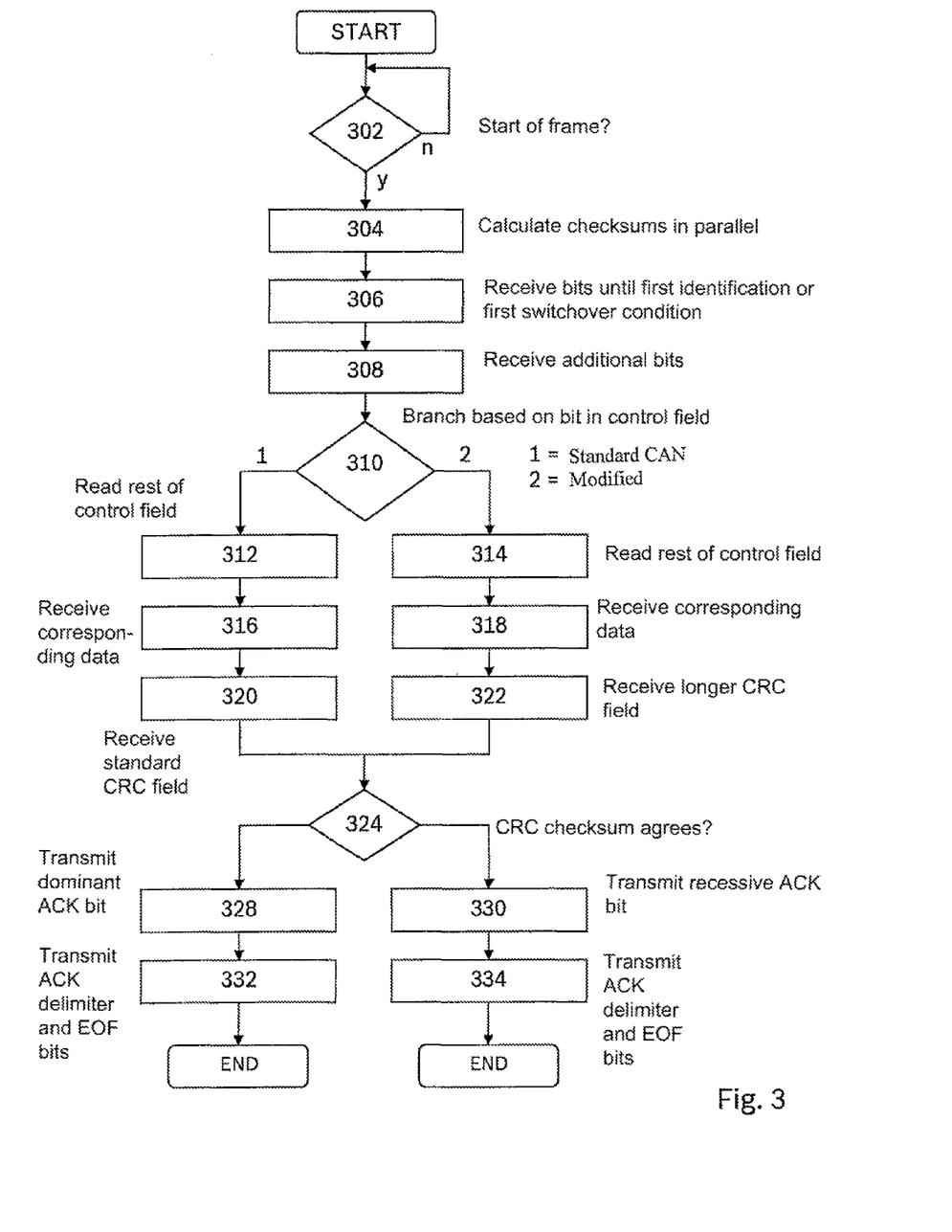
FIG. 3 schematically represents an exemplary embodiment for the receiving process on a subscriber station, according to the present invention, of the type "CAN FD Long" of the bus system.

FIG. 3 shows in a simplified representation a segment of the receiving process according to the present invention, as it occurs in a subscriber station of the bus system. The case shown is one in which a compatibility with the standard CAN is achieved in that the behavior of the communications controller is adapted as a function of the first switchover condition. Although FIG. 3 shows a representation typical for describing program runs in software, the method is equally completely suited for implementation in hardware.

The subscriber station is first in a bus-scanning state, as long as there is no communications traffic on the bus. Query 302 is thus waiting for a dominant bit on the bus. This bit marks the start of a new message (start of frame).

As soon as the start of a new message has been determined, the calculation of the at least two CRC checksums to be calculated in parallel begins in Block 304. The first checksum corresponds to the CRC calculation of the standard CAN, while the second checksum is calculated according to the new method. In the second CRC calculation, the stuff bits are included in the exemplary embodiment shown, whereas this is not the case in the calculation according to the standard CAN.

Subsequently, beginning with step 306, the additional bits of the message following the SOF bit are received, beginning with the arbitration field. If multiple bus subscribers want to send out a message, then the bus subscribers negotiate among themselves, in accordance with the usual method of the standard CAN, which bus subscriber gains access to the bus. Block 306 shown indicates the reception of all bits until first identification has been received or first switchover condition has been determined. In the example shown, the first switchover condition is ascertained from the control field, for instance, from the second bit of same, (cf. FIG. 1).

Subsequently, additional bits of the message may be received in block 308 until, beginning with a specific bit of the message as a function of the ascertained first switchover condition, a different method is followed. This split into different methods is ensured by a corresponding query or branching 310, as shown in the following by way of example.

If it is known at branching 310, for example following the reception of the second bit of the control field as dominant bit r0, that according to the first identification the communication occurs in accordance with the CAN standard (the path of FIG. 3 indicated by "1"), then the additional bits of the control field are read in in step 312. From these bits, the data length code is evaluated according to the CAN standard and subsequently, in step 316, the associated set of data, 8 bytes maximum, is received in accordance with the data field. The CRC field including 15 bits is then received in step 320. If it is known at branching 324 that the CRC checksum transmitted by the sender agrees with the CRC checksum ascertained by the receiver, then a dominant acknowledge bit is transmitted in block 328. It should be noted that in this case the standard-conforming CRC checksum is compared since the communication occurs according to the CAN standard. If no agreement is determined, the acknowledge bit is transmitted recessively (block 330). Thereafter, the ACK delimiter and the EOF bits follow in step 332 or 334. This ends a receiving process for one message.

The rules of CAN Standard ISO 11898-1 apply with respect to inserting stuff bits on the part of the sender and removing them on the part of the receiver. The stated field sizes refer to the data volume after the removal of the stuff bits. The inserted stuff bits are removed again from the data stream received even for the calculation of the CRC checksum according to the standard.

By contrast, if it is known at branching 310, for example after receiving the second bit of the control field as the recessive EDL bit, that the communication method modified in accordance with the present invention is to be used (the path in FIG. 3 designated by "2"), then the next bits of the control field are read in in block 314. In this case, for example, additional bits supplemented in the control field may also be read in, which may be used, for instance, for switching over to an additional deviating CRC polynomial, or even for switching over the bit length, for synchronization or for additional purposes. This aspect will be taken up below in more detail. From the result, the data length code is ascertained according to the new interpretation, for which some examples are listed in tabular form in FIG. 2. In block 318, the corresponding volume of data is received, that is, up to 15 bytes for the example DLC 1 from the table in FIG. 2, up to 16 bytes for the example DLC 2, up to 24 bytes for the example DLC 3, and up to 64 bytes for the example DLC 4. The CRC field deviating in accordance with the present invention, being in particular longer, is received in block 322. If it is known at branching 324 that the CRC checksum transmitted by the sender agrees with the CRC checksum ascertained by the receiver, then a dominant acknowledge bit is transmitted in block 328, the comparison in this case being based on the CRC checksum that deviates in accordance with the present invention. Otherwise, the acknowledge bit is transmitted recessively (Block 330). Thereafter, the ACK delimiter and the EOF bits follow in step 332 or 334. This ends a receiving process for one message.

Here, too, the rules of CAN Standard ISO 11898-1 apply with regard to the insertion of stuff bits on the part of the sender or to the removal on the part of the receiver, for the transmission of the arbitration field, the control field and the data field. In block 322, the stuffing control unit is switched over from the data-dependent mode to the counter-dependent mode. The fixed stuff bits or fixed stuff bit sequences, inserted by the sender at regular intervals, are thereby removed again on the part of the receiver, for further processing. The stated field sizes refer to the data volume after the removal of the stuff bits or rather the fixed stuff bits. For the calculation of the CRC checksum deviating from the standard, the inserted stuff bits are taken into account, however, the fixed stuff bits or the fixed stuff bit sequences, inserted according to the present invention, are removed again from the data stream received.

FIG. 3 shows the case in which the additional identification, which determines the CRC to be used, agrees with first identification, which concerns the size of the data field and the interpretation of the data length code. Thus, prior to the reception 320 or 322 of the CRC checksums, no additional query was made as to which CRC is to be received according to the additional identification and to be evaluated for branching 324. By a simple modification of the flow chart in FIG. 3, this additional query is able to be taken up into the sequence, if necessary.

Figure 4:
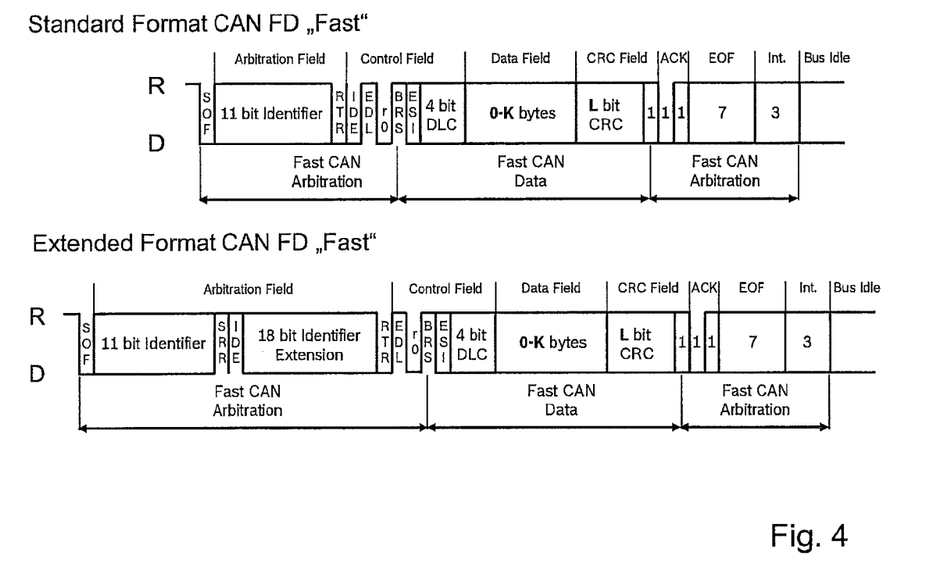
FIG. 4 shows two additional examples for messages modified in the data transmission method, according to the present invention, of the type "CAN FD Fast", in which, compared to FIG. 1b, additional areas are established within the message, in which a different bit length is used according to the present invention.

FIG. 4 shows two additional examples of messages modified according to the present invention, in which, by contrast to FIG. 1b, additional areas within the message are established, in which, according to the present invention, a different bit length is used, and thus the individual bits are transmitted via the bus more rapidly. The messages therefore bear the label "CAN FD Fast". For the two possible addressing variants of messages, the standard format and the extended format, areas are drawn in FIG. 4, in which a switchover is made between two states designated as Fast CAN Arbitration and Fast CAN Data. This switchover between the two states has the effect, that the bit lengths are shortened and thus the individual bits are transmitted more rapidly over the bus. This makes it possible to shorten the transmission time for a message compared to the standard-conforming method. The associated change in the bit length in time may implemented, for example, by using at least two different scaling factors for setting the bus time unit relative to a smallest time unit or the oscillator clock pulse in ongoing operation. The switchover of the bit length as well as the corresponding change of the scaling factor are shown in FIG. 4, also by way of example.

The transition between the states of Fast CAN Arbitration and Fast CAN Data occurs in messages that have the first identification EDL, as a function of a second identification, which signals to the subscribers of the data transmission that the shortened bit length is being used. In the exemplary embodiment shown here, the position of this identification is an additional bit in the control field which is designated by BRS (bit rate switch). In the example shown, it is transmitted as the fourth bit of the control field.

In the case shown, in which the first identification EDL is thus followed by the second identification BRS, messages are transmitted in the transmission method according to the present invention, the bit length of which is clearly shortened, the data field size of which is expandable to values above 8 bytes, and the CRC of which is adapted to the larger data field and expanded to stuff bits previously inserted in the message. A substantial increase of the transmission capacity via the bus system is thus achieved while the transmission reliability is at the same time improved.

In the example shown, the faster transmission begins immediately after the transmission of the associated identification and is ended immediately after reaching the bit defined for the reverse switchover or when a reason for starting an error frame has been detected.

Figure 5:
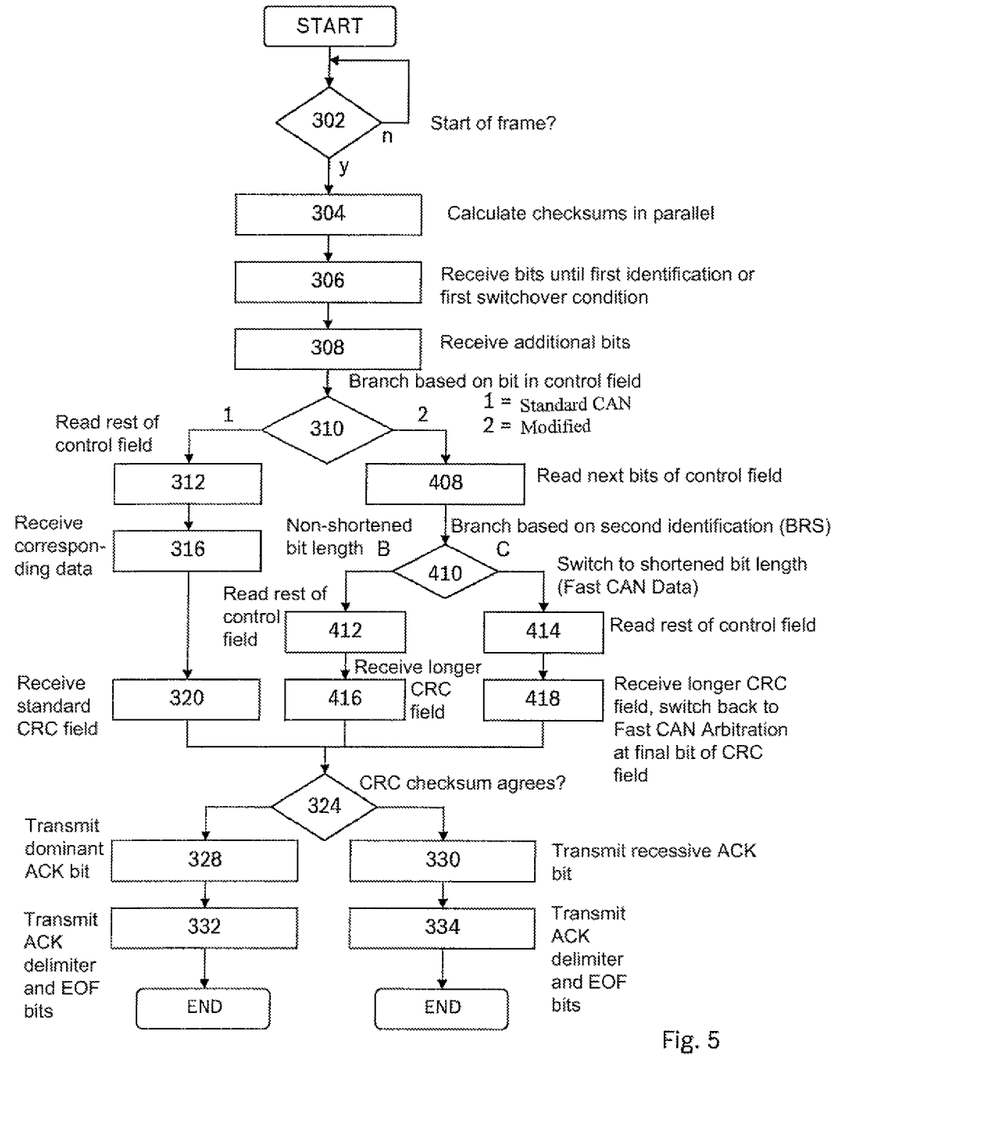
FIG. 5 schematically represents an exemplary embodiment for the receiving process on a subscriber station, according to the present invention, of the type "CAN FD Long" of the bus system.

FIG. 5 shows a receiving process that is modified compared to FIG. 3, in which additionally a switchover is made between the states of Fast CAN Arbitration and Fast CAN Data as a function of the second identification BRS. If it is known at branching 310, for example after receiving the second bit of the control field as the recessive EDL bit, that the communication method modified in accordance with the present invention is to be used, then the next bits of the control field are read in block 408. If the bit used for the second identification, for example the fourth bit BRS of the control field extended in accordance with the present invention, is received having the provided value, for example recessively, then the state Fast CAN Data is assumed for example at the sample point of this bit, that is, a switchover is made to the shortened bit length (path "C"). If the respective bit has the opposite value, that is, dominant in this example, then the bit length is not shortened (path "B"). In blocks 412 or 414, the remaining bits of the control field including the data length code are received as well as the data field according to the size information from the data length code. Reception is at normal bit length in block 412, and at shortened bit length in block 414. In blocks 416 or 418, the CRC field deviating in accordance with the present invention, being in particular longer, is read in. In block 418, at the final bit of the CRC field, the CRC delimiter, a switchover is made back to the state of Fast CAN Arbitration at a normal bit rate. Subsequently, a check is performed at branching 324 analogous to FIG. 3 to determine whether the CRC checksum transmitted by the sender agrees with the CRC checksum ascertained by the receiver, and the further method is selected accordingly, as was already the case in FIG. 3.

Here, too, the rules of CAN Standard ISO 11898-1 apply with regard to the insertion of stuff bits on the part of the sender or to the removal on the part of the receiver, for the transmission of the arbitration field, the control field and the data field. In blocks 416 and 418, the stuffing control unit is switched over from the data-dependent mode to the counter-dependent mode. The fixed stuff bits or fixed stuff bit sequences, inserted by the sender at regular intervals, are thereby removed again on the part of the receiver. The stated field sizes refer to the data volume after the removal of the stuff bits or rather the fixed stuff bits. For the calculation of the CRC checksum deviating from the standard, the inserted stuff bits are taken into account, however, the fixed stuff bits or the fixed stuff bit sequences, inserted according to the present invention, are removed again from the data stream received.

Figure 6A:
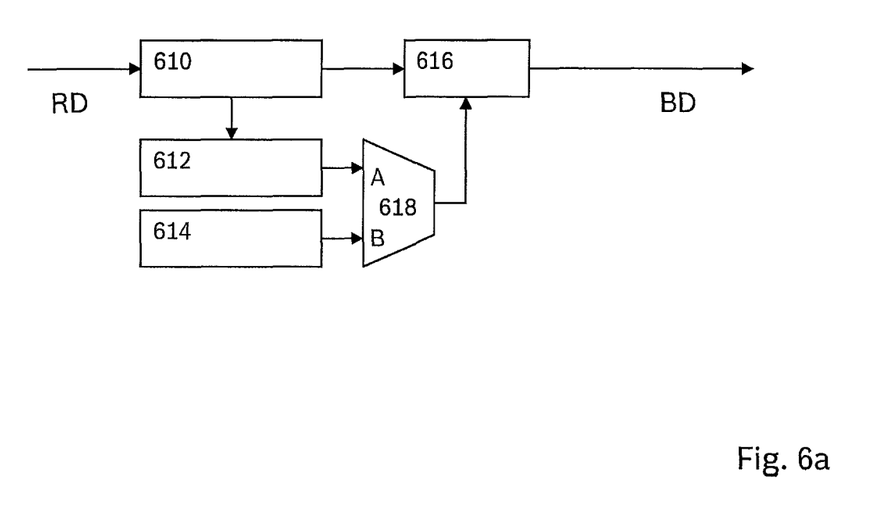
FIG. 6a schematically shows a section of the control unit, which, in devices according to the present invention, carries out the insertion of additional fixed stuff bits or fixed stuff bit sequences into messages sent.
Figure 6B:
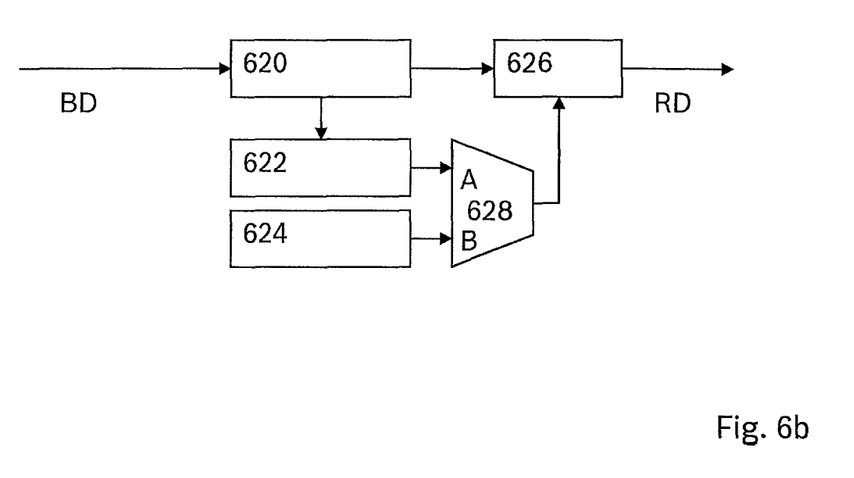
FIG. 6b schematically shows a section of the control unit, which, in devices according to the present invention, carries out the removal of additional fixed stuff bits or fixed stuff bit sequences from messages received.

FIG. 6a schematically shows a section of the control unit, which, in devices according to the present invention, particularly communications controllers, carries out the insertion of additional fixed stuff bits or fixed stuff bit sequences into messages sent. FIG. 6b schematically shows a section of the control unit, which, in devices according to the present invention, carries out the removal of additional fixed stuff bits or fixed stuff bit sequences from messages received. The actual useful data, which are to be transmitted, are designated by RD ("raw data") and the data supplemented by (fixed) stuff bits, which are present on the bus, are designated by BD ("bus data").

In the usual CAN bit stuffing method, bits scanned at the scanning point in time, both on the receiver side and the sender side, are shifted into a five-bit wide stuff shift register 610 or 620. If all five bits of this register have the same value, this is a stuff condition. This is determined in an evaluation unit 612 or 622. If no stuff condition is present, the data shift registers in the sender and in the receiver are shifted by one bit, once per CAN bit time. The sender of a message, in each case, sends the output bit of his data shift register, and the receiver shifts the scanned bit into his data shift register. If the evaluation unit of sender 612 determines a stuff condition, an insertion unit 616 effects that the data shift registers are not shifted, but that the sender sends a bit that is inverse to the preceding bit, as the following bit. The bus data BD are thus supplemented by this bit compared to the raw data RD. If the evaluation unit of receiver 622 determines a stuff condition in the bus data BD, a removing unit 626 effects that the following bit is not shifted into the data shift register, but that it is checked whether the bit is inverse to the preceding bit. If this is not the case, a stuff error is detected. The bit is removed from the bus data and is then no longer present in the raw data RD, which are supplied for further processing.

In the transmission method according to the present invention, the insertion or removal of stuff bits may be controlled by a control unit that is able to be switched over between at least two modes, as shown in FIGS. 6a and 6b. The control unit is supplemented by a subcontrol unit 614 or 524 and a selection unit 618 or 628. For instance, during the transmission of the bits protected by the CRC in the arbitration field, control field and data field, the inserting or removing of stuff bits (same as in the standard CAN method) is a function of the content of stuff shift register 610 or 620. In another subarea of the message, for instance, during the transmission of the CRC field of the message, switching over takes place to a counter-dependent behavior. In the example shown, a subcontrol unit 614 or 624 having five states is used for this purpose, of which one state corresponds to a fixed stuff condition. As in the case of the presence of a stuff condition, in response to the presence of a fixed stuff condition, insertion unit 616 or removal unit 626 is addressed. Subcontrol unit 614 or 624, with each CAN bit clock pulse, cyclically changes between the five states, so that for every fifth bit insertion unit 616 or removal unit 626 is addressed. Then, just as in the standard CAN method, a bit, that is inverse to the preceding bit, is inserted by the sender into the bus data BD, and on the other hand is checked by the receiver and then removed again. Upon application of this method, in the CRC field, that is, always groups of four bits of the CRC sequence are transmitted, separated by a single fixed stuff bit.

As was described before, in place of the fixed stuff bit, in each case a fixed stuff bit sequence may also be inserted, for instance, after a "1" a sequence "0 1" or after a "0", a sequence "1 0". Also, for example, after each third data bit of the CRC sequence, a fixed stuff bit sequence could be inserted. Further modes may also be provided, so that, for instance, as a function of the mode, a fixed stuff bit sequence follows either after every third data bit or after every fourth data bit.

Subcontrol unit 614 or 624 is set in such a way, at the beginning of the CRC field transmission, that the fixed stuff condition is satisfied, for example. Consequently, the CRC field begins with a fixed stuff bit or a fixed stuff bit sequence, and the positions of all fixed stuff bits in the CRC field of the message are firmly specified. If the stuff condition at the beginning of the CRC field is satisfied anyway, because, for example, the data field ends with five equal bits, the stuff bit at the beginning of the CRC field also satisfies this stuff condition.

Alternatively, subcontrol unit 614 or 624 may also be implemented as a cyclic stuffing counter, for instance, having a value range of 0 to 4, which is set back to 0 at the beginning of the CRC field and whose recurring value 0 in each case triggers the insertion of a fixed stuff bit or a fixed stuff bit sequence.

All stuff bits before the last data bit of the data field are also protected by the CRC checking, and the fixed stuff bits after the last data bit of the data field are masked out in response to the generation and checking of the CRC sequence.

The always dominant bit r0, following the recessive bit of the first identification EDL in the messages according to the present invention (or rather, in the case of extended addressing, possibly bit r1) leads, as may be read off, for example, in FIGS. 1b and 4, to a recessive-dominant edge in all the data messages according to the present invention. This edge may be drawn upon for improving the synchronization between the bus subscribers, which is of advantage particularly in the provided switchover to the shorter bit lengths.

When all bus subscribers in the network have been synchronized to the transmitting subscriber, one may switch over without a problem to the shorter bit length. What may also occur, however, is that at the bit provided for the switchover, not all the bus subscribers are synchronized to the transmitting subscriber, for instance, if a first sending subscriber sends the bit sequence "dominant-dominant" at the end of the arbitration field, and a second sending subscriber, that would like access to the bus within the scope of the arbitration, sends the bit sequence "dominant-recessive". The second sending subscriber loses the arbitration on the recessive bit and becomes a receiver. Up to the recessive bit, both senders has sent the same bit sequence. Since both transmitters, based on the propagation times over the CAN bus and the transceivers see the respectively self-sent edges from recessive to dominant earlier than those sent by the respectively other sender, neither has synchronized with the other.

Now, when the bit length is switched over, before the bus subscriber who has newly become a receiver synchronizes with the remaining sender, the synchronization takes place after the switchover, in the range of the shorter bit length. The phase shift because of the synchronization is then greater relative to the bit length. Depending on the signal propagation time between the two bus subscribers, the phase shift may become so great that a simulation of a frame alignment signal occurs and a bit is scanned in error. The receiver will then not recognize the message received as valid, and will destroy it using an error frame.

In the standard CAN communication, this problem does not arise, since there the propagation segment of the CAN bit timings compensates for the phase shifts between the bus subscribers effected by the signal propagation times. In the configuration for a shorter bit length, the propagation segment may, however, be minimized or omitted entirely, in order to shorten the bit length.

In order to avoid the simulation of the frame alignment signal after the switchover of the bit length, a synchronization before the switchover of the bit length by suitable measures has to be ensured. This may be achieved in that a synchronization is carried out at the edge of EDL (recessive) to r0 or r1 (dominant). In particular, a hard synchronization may be carried out instead of the resynchronization that is usual otherwise within a frame. This is, for example, also carried out at the start-of-frame bit and reliably balances out possible phase shifts. In the case of the resynchronization usual otherwise within a frame, a residual error may remain if the phase error is greater than the configured resynchronization jump width (SJW).

As a variant of the method shown, the switchover to shortened bit lengths as a function of the value of the second identification BRS may be coupled in addition with the dominant value of the previously transmitted r0 bit, so that a switchover to a shorter bit length occurs only if r0 dominant has been transmitted. This supplement of the method permits using a bit sequence, in which a recessive bit instead of the dominant r0 bit follows the recessive EDL bit, for future additional message formats, as, for example, for a bit encoding deviating from the standard in subareas of the message.

The possibility of inserting additional bits in the control field of the messages according to the present invention may further be used to make easier the detection of bus subscribers which are in the "error passive" state. A bus subscriber having communications controllers from the related art assumes the state "error passive" if the transmit or receive error count is 128 or higher. If the bus subscriber is in the state "error passive", he is not allowed to send any "active error flags" (six successive dominant bits). If the bus subscriber detects an error, he sends a "passive error flag" (six successive recessive bits). However, on the CAN bus one is not able to distinguish between a "passive error flag" and an idle signal. That is, other bus subscribers, under certain circumstances, are only able to detect indirectly that a bus subscriber is in the "error passive" state.

By contrast, the advantage of the method proposed herein is that, using this method, bus subscribers that are in the "error passive state", are able to be clearly identified by the other bus subscribers. Up to the present, this is not possible via the receiving of a "passive error flag". The state "error passive" in bus subscribers of the related art is able to be detected only by a microprocessor connected locally to the CAN controller, and notified to the other bus subscribers, for example, by a corresponding status message. Because of the new method, it is not necessary for the microprocessor to transmit a status message. Besides, in this case the information on the "error passive" state is current at the transmission time, while during the transmission of a status message, between the setting up of the status message by the microprocessor and the transmission time, the state has changed.

In the method described here, the information on the state "error passive" of a communications controller is integrated into the messages sent by the bus subscribers anyway. For this, the control field of the message is extended by an additional bit (ESI). This bit, as shown in FIG. 1b, is inserted after the first identification (EDL) and before the DLC, for instance, directly before or directly after the BRS bit. A bus subscriber that is in the "error passive" state sends this bit dominant, for example, whereas otherwise the bit is sent recessive. A reverse logic is also possible.

The transmission method provided is suitable in the normal operation of a motor vehicle for transmitting data between at least two control units of the motor vehicle, which are connected via a suitable data bus. It may equally be used advantageously during the manufacturing or maintenance of a motor vehicle for transmitting data between a programming unit connected to a suitable data bus for programming purposes and at least one control unit of the motor vehicle that is connected to the data bus. It is furthermore also possible to use the method in industrial automation, that is, for example in the transmission of control information between distributed control units interconnected by the bus, which control the course of an industrial manufacturing process. In this environment there may also be very long bus lines and it may be particularly practical to operate the bus system for the arbitration phase at a relatively long bit length, for example at 16, 32 or 64 microseconds, so that the bus signals, as required, are able to propagate through the entire bus system during the arbitration process. Subsequently, a switchover to shorter bit lengths may be performed for part of the message, as described, so as not to let the average transmission rate drop too low.

Overall, the method represents a transmission method that is characterized by the fact that a standard CAN controller only needs to be modified minimally in order to work in accordance with the present invention. A communications controller according to the present invention, which is also able to work as a standard CAN controller, is only negligibly larger than a conventional standard CAN controller. The associated application program does not need to be modified, and even then advantages in the speed of data transmission are already achieved. Using the extended size of the data field and the associated DLC and CRC makes it possible to increase the speed of data transmission further, while adaptations in the application software are minimal. Substantial portions of the CAN conformance test (ISO 16845) may be adopted. It is also possible to combine the transmission method according to the present invention with the supplements of TTCAN (ISO 11898-4).

What is claimed is:

1. A method for serial data transmission in a bus system having at least two bus subscribers who exchange messages over the bus, wherein access for sending the messages through the bus is assigned to the at least two bus subscribers using an arbitration method according to the CAN Standard ISO 11898-1, the messages including, in accordance with the CAN standard, data bits organized in a start-of-frame bit, an arbitration field, a control field, a data field, a CRC field, an acknowledge field and an end-of-frame field, the method comprising:
inserting, in the presence of a stuff condition, stuff bits between data bits of a message to be transmitted, according to the CAN standard;
calculating a first CRC sequence for the message according to the CAN standard;
calculating, in parallel with the calculation of the first CRC sequence, at least one additional CRC sequence using a generator polynomial deviating from the CAN standard, wherein the at least one additional CRC sequence is calculated taking into account stuff bits that were inserted before the beginning of the CRC field;
selecting one sequence from among the calculated CRC sequences based on a first identification (EDL) contained in the message, wherein the selected CRC sequence is included in the CRC field for use in checking a correctness of a transmission of the message; and
checking for an additional condition if the first identification EDL has a specified value, wherein fixed stuff bit sequences are inserted into the message by a sender if the additional condition is present, and wherein each fixed stuff bit sequence includes at least one bit.

2. The method of claim 1, wherein the fixed stuff bit sequences inserted by the sender are removed on the receiver side for further processing of the message.

3. The method of claim 1, wherein the additional condition is specified as a function of a counter, so that the fixed stuff bit sequences are inserted into the message at regular intervals designated according to a value of the counter.

4. The method of claim 1, wherein the first inserted bit of each fixed stuff bit sequence has a value that is inverse to that of the preceding bit.

5. The method of claim 1, wherein at most four data bits of the data to be transmitted are situated between consecutive fixed stuff bit sequences.

6. The method of claim 1, wherein the fixed stuff bit sequences are inserted into at least the CRC field of the message if the additional condition is present.

7. The method of claim 6, wherein, the fixed stuff bit sequences are inserted throughout the message if the additional condition is present.

8. The method of claim 1, wherein the CRC field of the message has a number of bits deviating from the CAN standard if the first identification EDL has the specified value.

9. The method of claim 1, wherein each fixed stuff bit sequence is made up of one single bit, in the case of a preceding "0", "1" being inserted as the fixed stuff bit sequence, and in the case of a preceding "1", "0" being inserted as the fixed stuff bit sequence.

10. The method of claim 1, wherein each fixed stuff bit sequence is made up of two bits, in the case of a preceding "0", "1 0" being inserted as the fixed stuff bit sequence, and in the case of a preceding "1", "0 1" being inserted as the fixed stuff bit sequence.

11. The method of claim 1, wherein, in the presence of the additional condition, the fixed stuff bit sequences are inserted into the message only in the CRC field and the CRC field begins with one of the fixed stuff bit sequences.

12. The method of claim 1, wherein the control field of the message includes more than six bits, in deviation from the CAN standard, if the first identification EDL is present.

13. The method of claim 1, wherein the first identification EDL includes a recessive second bit in the control field if the message uses standard CAN addressing, and wherein the first identification EDL includes a recessive first and/or second bit in the control field if the message uses extended addressing.

14. The method of claim 13, wherein at least one dominant bit follows the recessive bit of the first identification EDL if the first identification EDL is present.

15. The method of claim 13, wherein, in response to the presence of the first identification EDL, an edge between the recessive bit of the first identification EDL and at least one following dominant bit is used for the resynchronization or the hard synchronization of a bit timing of the bus subscribers.

16. The method of claim 1, wherein, in the presence of the first identification EDL:
the data field of the message, in deviation from the CAN Standard ISO 11898-1, is able to include more than eight bytes, and
the values of the four bits of a data length code are interpreted at least partially in deviation from the CAN Standard ISO 11898-1 when determining a size of the data field.

17. The method of claim 16, wherein the first identification EDL is evaluated in the bus subscribers and, as a function of the first identification EDL and the data length code, a receiving process is adjusted to the size of the data field.

18. The method of claim 1, wherein, in response to the presence of a second identification (BRS), a bit length for at least one specified region within the message assumes a reduced value with respect to a bit length used before the presence of the second identification, the specified region beginning at the earliest with the second identification BRS and ending at the latest with a CRC delimiter, the second identification BRS occurring only when the first identification EDL is present, and wherein the second identification BRS is located in the control field of the message, which control field includes, in deviation from the CAN Standard ISO 11898-1, more than six bits.

19. The method of claim 18, wherein the second identification BRS includes a recessive bit in the control field, which recessive bit is transmitted after the first identification EDL.

20. The method of claim 19, wherein, in response to the presence of the second identification BRS, the recessive bit of the second identification BRS is separated from a recessive bit of the first identification EDL by at least one dominant bit.

21. The method of claim 18, wherein the second identification BRS is evaluated in the bus subscribers if the first identification EDL is present, and as a function of the value of the second identification BRS, the receiving process is adjusted to different bit lengths of separate regions within the message.

22. The method of claim 18, wherein at least two different bit lengths within the message are implemented by using at least two different scaling factors for setting a bus time unit relative to a smallest time unit or an oscillator clock pulse in ongoing operation.

23. The method of claim 1, wherein the message is transmitted between at least two control units of a motor vehicle, which control units are connected via the bus.

24. The method of claim 1, wherein the message is transmitted between at least two control units in an industrial control system, which control units are connected via the bus.

25. The method of claim 1, wherein during the manufacturing or maintenance of a motor vehicle, the message is transmitted between a programming unit connected to the bus for programming purposes and at least one control unit of the motor vehicle that is also connected to the bus.

26. A method for serial data transmission in a bus system having at least two bus subscribers who exchange messages over the bus, wherein access for sending the messages through the bus is assigned to the at least two bus subscribers using an arbitration method according to the CAN Standard ISO 11898-1, the messages including, in accordance with the CAN standard, data bits organized in a start-of-frame bit, an arbitration field, a control field, a data field, a CRC field, an acknowledge field and an end-of-frame field, the method comprising:
inserting, in the presence of a stuff condition, stuff bits between data bits of a message to be transmitted, according to the CAN standard;
calculating a first CRC sequence for the message according to the CAN standard;
calculating, in parallel with the calculation of the first CRC sequence, at least one additional CRC sequence using a generator polynomial deviating from the CAN standard, wherein the at least one additional CRC sequence is calculated taking into account stuff bits which were inserted before the beginning of the CRC field;
selecting one sequence from among the calculated CRC sequences based on a first identification (EDL) contained in the message, wherein the selected CRC sequence is included in the CRC field for use in checking a correctness of a transmission of the message; and
checking for an additional condition if the first identification EDL has a specified value, wherein fixed stuff bit sequences are inserted into the message by a sender if the additional condition is present, and wherein each fixed stuff bit sequence includes at least one bit.

27. A device for serial data transmission in a bus system having at least two bus subscribers who exchange messages over the bus, wherein access for sending the messages through the bus is assigned to the at least two bus subscribers using an arbitration method according to the CAN Standard ISO 11898-1, the messages including, in accordance with the CAN standard, data bits organized in a start-of-frame bit, an arbitration field, a control field, a data field, a CRC field, an acknowledge field and an end-of-frame field, the device comprising:
an insertion arrangement, which in the presence of a stuff condition, inserts stuff bits between data bits of a message to be transmitted, according to the CAN standard;
a first arrangement which calculates a first CRC sequence for the message according to the CAN standard, wherein the first arrangement calculates, in parallel with the calculation of the first CRC sequence, at least one additional CRC sequence using a generator polynomial deviating from the CAN standard, wherein the at least one additional CRC sequence is calculated taking into account stuff bits which were inserted before the beginning of the CRC field;
a second arrangement to select one sequence from among the calculated CRC sequences based on a first identification (EDL) contained in the message, wherein the selected CRC sequence is included in the CRC field for use in checking a correctness of a transmission of the message; and a third arrangement to check for an additional condition if the first identification EDL has a specified value, and in response to a presence of the additional condition, insert fixed stuff bit sequences into the message, wherein each fixed stuff bit sequence includes at least one bit.

28. The device of claim 27, wherein the second arrangement includes at least one control unit that is switchable between at least two modes.

29. The device of claim 28, wherein the control unit that is switchable has at least one counter-dependent mode.

* * * * *